United States Patent (10) Patent No.: US 11,316,170 B2
Ochi et al. (45) Date of Patent: Apr. 26, 2022

(54) REDOX FLOW BATTERY CELL AND REDOX FLOW BATTERY

(71) Applicant: SUMITOMO ELECTRIC INDUSTRIES, LTD., Osaka (JP)

(72) Inventors: Yuta Ochi, Osaka (JP); Kenichiro Miyatake, Osaka (JP); Takashi Kanno, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/264,442

(22) PCT Filed: Aug. 13, 2018

(86) PCT No.: PCT/JP2018/030201
§ 371 (c)(1),
(2) Date: Jan. 29, 2021

(87) PCT Pub. No.: WO2020/035895
PCT Pub. Date: Feb. 20, 2020

(65) Prior Publication Data
US 2021/0313591 A1 Oct. 7, 2021

(51) Int. Cl.
*H01M 4/96* (2006.01)
*H01M 8/18* (2006.01)
*H01M 4/86* (2006.01)

(52) U.S. Cl.
CPC ............ *H01M 4/96* (2013.01); *H01M 8/188* (2013.01); *H01M 2004/8694* (2013.01)

(58) Field of Classification Search
CPC . H01M 4/96; H01M 8/188; H01M 2004/8694
See application file for complete search history.

(56) References Cited

U.S. PATENT DOCUMENTS

| 5,648,184 A | 7/1997 | Inoue et al. |
| 2017/0012299 A1 | 1/2017 | Itou et al. |
| 2017/0047594 A1 | 2/2017 | Hanafusa et al. |
| 2018/0102556 A1* | 4/2018 | Puranam ............ H01M 8/0234 |
| 2018/0277858 A1 | 9/2018 | Fujita et al. |

(Continued)

FOREIGN PATENT DOCUMENTS

| EP | 3240071 A1 | 11/2017 |
| JP | H08-287923 A | 11/1996 |
| JP | 2015-122230 A | 7/2015 |

(Continued)

OTHER PUBLICATIONS

Mar. 3, 2022 Extended European Search Report issued in European Patent Application No. 18930490.0.

*Primary Examiner* — Stewart A Fraser
(74) *Attorney, Agent, or Firm* — Oliff PLC (57) ABSTRACT

A redox flow battery cell includes: an electrode to which an electrolyte solution is supplied; and a bipolar plate with which the electrode is arranged, wherein the bipolar plate has at least one groove portion through which the electrolyte solution flows, on a face on the electrode side, the electrode is made of a carbon fiber aggregate containing carbon fibers, and has a buried portion that is pressed toward the bipolar plate side and buried into the groove portion, and an amount of burial of the buried portion is not less than 0.2 mm and not more than 1.4 mm.

15 Claims, 4 Drawing Sheets

(56) References Cited

U.S. PATENT DOCUMENTS

2018/0331373 A1* 11/2018 Byun .................... H01M 8/188

FOREIGN PATENT DOCUMENTS

| JP | 2015-122231 A | 7/2015 |
| JP | 2015-138771 A | 7/2015 |
| JP | 2015-210849 A | 11/2015 |
| JP | 2017-010809 A | 1/2017 |
| JP | 2017-091617 A | 5/2017 |
| JP | 2017-216077 A | 12/2017 |
| WO | 2013/095376 A1 | 6/2013 |

* cited by examiner

REDOX FLOW BATTERY CELL AND REDOX FLOW BATTERY

TECHNICAL FIELD

The present disclosure relates to a redox flow battery cell and a redox flow battery.

BACKGROUND ART

Redox flow batteries (which will be hereinafter referred to as "RF batteries" in some cases) are known as a type of large-capacity storage battery (see Patent Documents 1 to 4). Commonly, in the RF batteries, a cell stack is used in which a plurality of cell frames, positive electrodes, membranes, and negative electrodes are stacked. Each cell frame includes a bipolar plate that is arranged between a positive electrode and a negative electrode, and a frame member that is provided at an outer periphery of the bipolar plate. In the cell stack, the positive and negative electrodes are arranged with the membrane interposed between bipolar plates of adjacent cell frames, and thus one cell is formed. An RF battery is charged and discharged by circulating electrolyte solutions in the cell that contains the electrodes.

Patent Documents 1 to 4 disclose techniques that reduce pressure loss due to flow resistance of the electrolyte solutions in the cell by forming a plurality of groove portions through which the electrolyte solutions flow in a face of each bipolar plate on the electrode side.

CITATION LIST

Patent Documents

Patent Document 1: JP 2015-122230A
Patent Document 2: JP 2015-122231A
Patent Document 3: JP 2015-138771A
Patent Document 4: JP 2015-210849A

SUMMARY OF INVENTION

A redox flow battery cell of the present disclosure is
a redox flow battery cell including:
an electrode to which an electrolyte solution is supplied; and
a bipolar plate with which the electrode is arranged,
wherein the bipolar plate has at least one groove portion through which the electrolyte solution flows, on a face on the electrode side,
the electrode is made of a carbon fiber aggregate containing carbon fibers, and has a buried portion that is pressed toward the bipolar plate side and buried into the groove portion, and
an amount of burial of the buried portion is not less than 0.2 mm and not more than 1.4 mm.

A redox flow battery of the present disclosure includes the above-described redox flow battery cell of the present disclosure.

DESCRIPTION OF EMBODIMENTS

Problem to be Solved by the Present Disclosure

Further improvement of battery performance of redox flow batteries is desired.

Electrodes of the redox flow battery function as reaction fields that promote battery reactions of an active material (metal ions) contained in the supplied electrolyte solutions. A carbon fiber aggregate (e.g. carbon felt etc.) that contains carbon fibers is often used in the electrodes that constitute a redox flow battery cell (which will be hereinafter referred to simply as a "cell" in some cases). The electrodes made of the carbon fiber aggregate are accommodated in the cell in a compressed state. If a groove portion is provided in a face of each bipolar plate on the electrode side, when a cell is formed, a portion of each electrode enters a state of being buried into the groove portion due to the electrode being pressed toward the bipolar plate side.

As a result of intensive studies, the inventors have found that, if a cell is formed with electrodes made of a carbon fiber aggregate and a bipolar plate with a groove portion, reaction resistance of the electrodes can be reduced by controlling the amount of burial of each electrode buried into the groove portion of the bipolar plate within a certain range, and the battery performance can be thus improved. The reason that the reaction resistance of the electrode changes depending on the amount of burial of the electrode can be considered as follows. If the amount of burial of the buried portion of each electrode in the groove portion of the bipolar plate is too small, the fiber density at a portion located above the groove portion (i.e. a portion above the buried portion that is not buried into the groove portion; hereinafter referred to as a "non-buried portion") becomes too large, and a turbulent flow is likely to occur in the flow of the electrolyte solution that passes through this non-buried portion. Thus, the flow-smoothing effect of suppressing the turbulent flow of the electrolyte solution that passes through the electrode is lost. As a result, there is a possibility that the reaction region in contact with the electrolyte solution is reduced, and there is concern that the reaction resistance (flow rate-dependent resistance) of the electrode that depends on the flow rate of the electrolyte solution will increase. On the other hand, if the amount of burial of the buried portion of the electrode is too large, the fiber density at the portion located above the groove portion becomes too small, making it difficult for charge transfer at an interface between the electrode and the membrane to occur smoothly. This may increase the reaction resistance (charge transfer resistance) of the electrode due to the charge transfer.

An object of the present disclosure is to provide a redox flow battery cell capable of reducing the reaction resistance of the electrode while being able to reduce pressure loss of the electrolyte solution. Also, an object of the present disclosure is to provide a redox flow battery with excellent battery performance.

Effects of the Present Disclosure

According to the present disclosure, a redox flow battery cell can be provided that is capable of reducing the reaction resistance of the electrode while being able to reduce pressure loss of the electrolyte solution. In addition, according to the present disclosure, a redox flow battery with excellent battery performance can be provided.

DESCRIPTION OF EMBODIMENTS OF THE PRESENT DISCLOSURE

Firstly, the content of the embodiments of the present disclosure will be described in a list.

(1) A redox flow battery cell according to an embodiment is a redox flow battery cell including:

an electrode to which an electrolyte solution is supplied; and a bipolar plate with which the electrode is arranged, wherein the bipolar plate has at least one groove portion through which the electrolyte solution flows, on a face on the electrode side, the electrode is made of a carbon fiber aggregate containing carbon fibers, and has a buried portion that is pressed toward the bipolar plate side and buried into the groove portion, and an amount of burial of the buried portion is not less than 0.2 mm and not more than 1.4 mm.

According to the above redox flow battery cell, since the bipolar plate has the groove portion on the face on the electrode side, it is possible to reduce the flow resistance of the electrolyte solution flowing in the cell and reduce the pressure loss of the electrolyte solution in the cell. Accordingly, the internal resistance in the cell (cell resistance) can be reduced. In addition, due to the electrode being formed with a carbon fiber aggregate, pores are formed in the electrode. For this reason, the electrolyte solution flows through the electrode, allowing the electrolyte solution to permeate and diffuse in the electrode. Accordingly, the reaction area between the electrode and the electrolyte solution increases, and the reaction field can be readily secured.

The electrode made of the carbon fiber aggregate is flexible. Such an electrode is pressed toward the bipolar plate side and compressed and deformed when the cell is formed, and a portion of the electrode is buried into the groove portion of the bipolar plate to form a buried portion. Due to the amount of burial of this buried portion being not less than 0.2 mm and not more than 1.4 mm, the reaction resistance of the electrode can be reduced. If the amount of burial of the buried portion is not less than 0.2 mm and not more than 1.4 mm, the fiber density at the portion (non-buried portion) located above the groove portion can be appropriately maintained. Thus, a flow-smoothing effect of suppressing a turbulent flow of the electrolyte solution that passes through the electrode can be obtained, and charge transfer at an interface between the electrode and the membrane smoothly occurs. Accordingly, an increase in the flow rate-dependent resistance and the charge transfer resistance can be suppressed, so that the reaction resistance of the electrode can be reduced.

Accordingly, the above redox flow battery cell can reduce the reaction resistance of the electrode while being able to reduce the pressure loss of the electrolyte solution. Furthermore, if the amount of burial of the buried portion of the electrode that is buried into the groove portion of the bipolar plate is not less than 0.2 mm and not more than 1.4 mm, variations in the temperature change in the electrolyte solution flowing in the cell can be readily reduced. This makes it possible to readily maintain the stability of the electrolyte solution and further suppress degradation of the battery performance.

The "face on the electrode side" of the bipolar plate refers to a face that opposes the electrode and comes into contact therewith when the cell is formed. The "amount of burial of the buried portion" of the electrode refers to the largest length from an opening of the groove portion to a leading end of the buried portion in a cross-sectional in the thickness direction that is orthogonal to the surface of the bipolar plate in a state where the electrode is compressed, the cross-section being orthogonal to the lengthwise direction of the groove portion. Note that the face of the electrode on the side opposite to the face on the bipolar plate side that comes into contact with the bipolar plate is a face that opposes the membrane and comes into contact therewith when the cell is formed.

(2) In the redox flow battery cell according to the embodiment, a ratio of a cross-sectional area of the buried portion to a cross-sectional area of the groove portion may be not less than 0.4% and not more than 75%.

Due to the ratio (hereinafter referred to as a "burial ratio") of the cross-sectional area of the buried portion to the cross-sectional area of the groove portion being not less than 0.4% and not more than 75%, the reaction resistance of the electrode can be effectively reduced. Furthermore, in this case, variations in temperature change in the electrolyte solution flowing through the cell can be more readily reduced.

(3) In the redox flow battery cell according to the embodiment, a thickness of the electrode may be not less than 0.3 mm and not more than 1.5 mm.

Due to the thickness of the electrode being not less than 0.3 mm and not more than 1.5 mm, the amount of burial of the buried portion can be readily controlled within the above range.

The "thickness of the electrode" refers to the thickness in an uncompressed state thereof, i.e. a natural state where no external force acts on the electrode, rather than the thickness in a state where the electrode is incorporated into the cell and compressed. The thickness of the electrode can be measured not only before assembling the cell, but also after assembling the cell, by taking the electrode out of the cell. After assembling the cell, the electrode taken out of the cell is elastically restored from the compressed state in the cell to the original uncompressed state. Accordingly, the thickness of the electrode taken out of the cell may be considered to be substantially the same as the thickness in the uncompressed state before assembling the cell.

(4) In the redox flow battery cell according to the embodiment, a compression ratio of the electrode may be not less than 60% and not more than 95%.

Due to the compression ratio of the electrode being not less than 60%, the electrode is deformed and buried into the groove portion of the bipolar plate, and the buried portion can be readily formed. Due to the compression ratio of the electrode being not more than 95%, pores in the electrode are secured, and the flowability of the electrolyte solution can be readily secured sufficiently. Accordingly, the cell resistance due to the flow resistance of the electrolyte solution can be reduced.

When the thickness of the electrode in the compressed state is $T_1$, and the thickness in the uncompressed state is $T_0$, the compression ratio of the electrode can be calculated as $\{(T_0-T_1)/T_0\}\times100(\%)$.

(5) In the redox flow battery cell according to the embodiment, a porosity of the electrode may be not less than 70%.

Due to the porosity of the electrode being not less than 70%, the electrode can be readily deformed, and the buried portion can be readily formed. The upper limit of the porosity of the electrode may be, for example, 95% or less.

The "porosity of the electrode" refers to the porosity in an uncompressed state thereof, i.e. a natural state where no external force acts on the electrode, rather than the porosity in a state where the electrode is incorporated into the cell and compressed. The porosity can be measured not only before assembling the cell, but also after assembling the cell, by taking the electrode out of the cell. After assembling the cell, the electrode taken out of the cell is elastically restored from the compressed state in the cell to the original uncompressed state. Accordingly, the porosity of the electrode taken out of the cell may be considered to be substantially the same as the porosity in the uncompressed state before assembling the cell.

When the true volume of the electrode is V, and the apparent volume is Va, the porosity of the electrode can be calculated as $\{(Va-V)/Va\} \times 100(\%)$. The true volume V of the electrode can be calculated by dividing the mass of the electrode by the density of the carbon fibers that constitute the electrode.

(6) In the redox flow battery cell according to the embodiment, the carbon fiber aggregate may be at least one element selected from a group consisting of carbon felt, carbon cloth, and carbon paper.

Specifically, the carbon fiber aggregate may be any of carbon felt (a non-woven fabric of carbon fibers) and carbon cloth (a woven fabric of carbon fibers), which are formed by weaving together carbon fibers, and carbon paper (a composite material of carbon fibers and carbon), which is obtained by compounding carbon fibers and carbon. Of these, carbon felt or carbon cloth has a moderate degree of flexibility and is readily deformed. Accordingly, if carbon felt or carbon cloth is used as an electrode material, the electrode is buried into the groove portion of the bipolar plate, and the buried portion can be readily formed. In particular, in carbon felt, carbon fibers are randomly oriented. For this reason, if carbon felt is used as the electrode material, there are advantages such as ease of diffusion of the electrolyte solution to every corner of the electrode, which is preferable.

(7) In the redox flow battery cell according to the embodiment, an average fiber diameter of each of the carbon fibers may be not more than 20 μm.

Due to the average fiber diameter of each carbon fiber that constitute the electrode made of the carbon fiber aggregate being not more than 20 μm, the fibers are thin and flexible. Accordingly, the electrode can be readily deformed, and the buried portion can be readily formed. Due to the fibers being flexible, the fibers are unlikely to stick into the membrane. The lower limit of the average fiber diameter of each carbon fiber may be, for example, not less than 5 μm.

The fiber diameter of each carbon fiber is the diameter of a circle with an area equal to the cross-sectional area of each fiber (the equal-area circle diameter). The "cross-sectional area of each fiber" refers to the projected area of the fiber cross-section orthogonal to the longitudinal direction of the fiber.

(8) In the redox flow battery cell according to the embodiment, a Young's modulus of the carbon fibers may be not less than 20 GPa and not more than 200 GPa.

Due to the Young's modulus of the carbon fibers that constitute the electrode made of the carbon fiber aggregate is not less than 20 GPa, the bending rigidity of the fibers is high. For this reason, when the electrode is deformed and compressed, damage to the electrode can be suppressed. Due to the Young's modulus of the carbon fibers being not more than 200 GPa, the electrode can be readily deformed, and the buried portion can be readily formed.

Specifically, the carbon fibers may be PAN-based carbon fibers made of polyacrylonitrile (PAN) fiber, pitch-based carbon fibers made of pitch fiber, or rayon-based carbon fibers made of rayon fiber.

(9) A redox flow battery according to an embodiment includes the redox flow battery cell according to any one of the above items (1) to (8).

The above redox flow battery, due to including the redox flow battery cell according to any of the above embodiments, can reduce the reaction resistance of the electrode while being able to reduce the pressure loss of the electrolyte solution in the cell. Accordingly, the above redox flow battery has excellent battery performance.

DETAILS OF EMBODIMENTS OF THE PRESENT DISCLOSURE

Specific examples of a redox flow battery cell (hereinafter referred to simply as a "cell" in some cases) and a redox flow battery (RF battery) according to an embodiment of the present disclosure will be described below with reference to the drawings. The same reference numerals in the diagram denote the same or corresponding parts. The present invention is defined by the terms of the claims, but not limited to the above description, and is intended to include any modifications within the meaning and scope equivalent to the terms of the claims RF Battery An example of an RF battery 1 according to an embodiment and a cell 10 included in the RF battery 1 will be described with reference to FIGS. 1 to 5. The RF battery 1 shown in FIGS. 1 and 2 uses an electrolyte solution that contains, as an active material, metal ions whose valence changes due to redox, as a positive electrolyte solution and a negative electrolyte solution. The RF battery 1 is charged and discharged using a difference between the redox potential of ions contained in the positive electrolyte solution and the redox potential of ions contained in the negative electrolyte solution. Here, a vanadium-based RF battery that uses a vanadium electrolyte solution containing vanadium (V) ions as the positive electrolyte solution and the negative electrolyte solution is shown as an example of the RF battery 1. In a cell 10 in FIG. 1, solid arrows indicate a charge reaction, and dashed arrows indicate a discharge reaction. The RF battery 1 is connected to a power grid 90 via an AC-DC converter 80. For example, the RF battery 1 is used for the purposes of load leveling, instantaneous voltage drop compensation and emergency power supply, as well as output smoothing for natural energy power generation, such as solar power generation and wind power generation.

The RF battery 1 includes a cell 10 that is charged and discharged, tanks 106 and 107 for storing the electrolyte solutions, and circulation paths 100P and 100N for circulating the electrolyte solutions between the tanks 106 and 107 and the cell 10.

Cell

Figure 1:
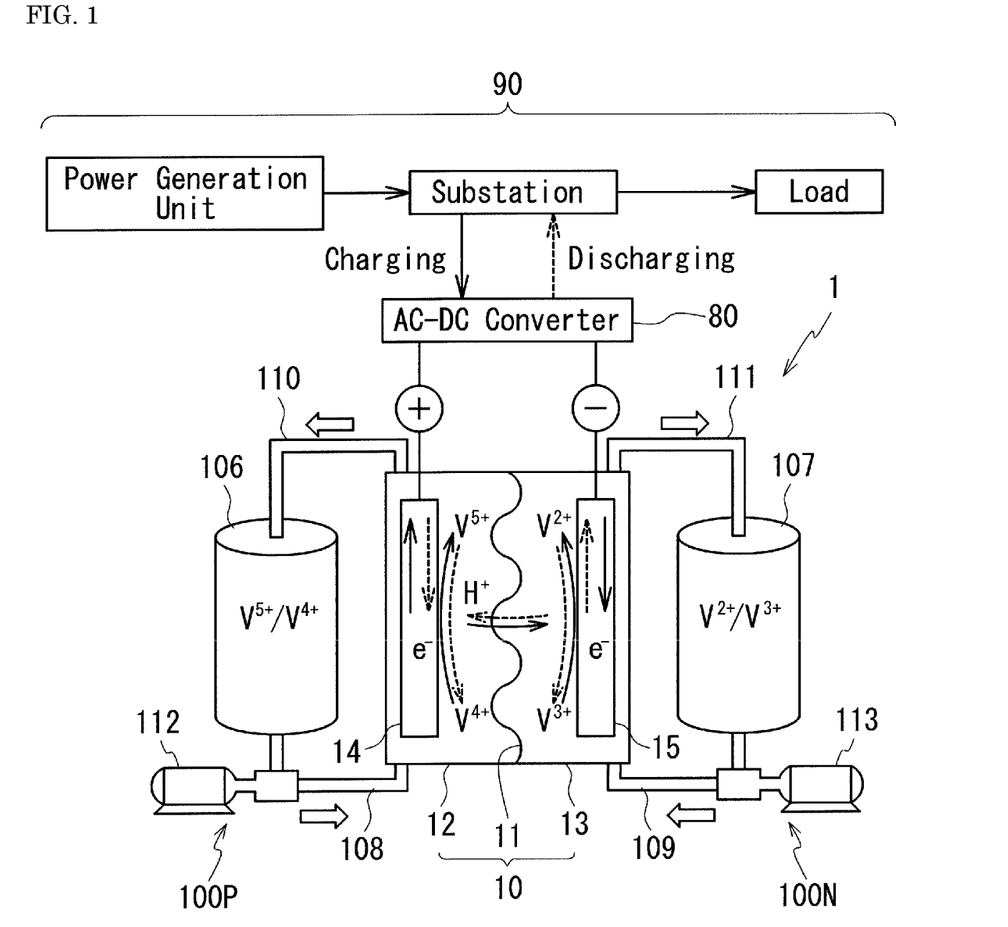
FIG. 1 is a diagram illustrating an operating principle of a redox flow battery according to an embodiment.

As shown in FIG. 1, the cell 10 has a positive electrode 14, a negative electrode 15, and a membrane 11 that is interposed between these two electrodes 14 and 15. The structure of the cell 10 is separated into a positive electrode cell 12 and a negative electrode cell 13 with the membrane 11 therebetween, and the positive electrode 14 and the negative electrode 15 are contained in the positive electrode cell 12 and the negative electrode cell 13, respectively.

The positive electrode 14 and the negative electrode 15 are made of a carbon fiber aggregate that contains carbon fibers, and is formed with any of carbon felt, carbon cloth, and carbon paper, for example. The carbon fibers may be PAN-based carbon fibers, pitch-based carbon fibers, or rayon-based carbon fibers, for example. The membrane 11 is formed with, for example, an ion exchange membrane that allows hydrogen ions to pass through.

In the cell 10 (the positive electrode cell 12 and the negative electrode cell 13), the electrolyte solutions (the positive electrolyte solution and the negative electrolyte solution) circulate through the circulation paths 100P and 100N. A positive electrolyte solution tank 106 for storing the positive electrolyte solution is connected to the positive electrode cell 12 via the positive electrode circulation path 100P. Similarly, a negative electrolyte solution tank 107 for storing the negative electrolyte solution is connected to the negative electrode cell 13 via the negative electrode circulation path 100N. The circulation paths 100P and 100N respectively have supply pipes 108 and 109 for feeding the electrolyte solutions from the respective tanks 106 and 107 to the cell 10, and return pipes 110 and 111 for returning the electrolyte solutions from the cell 10 to the respective tanks 106 and 107. The supply pipes 108 and 109 are provided with pumps 112 and 113, respectively, for pumping the electrolyte solutions stored in the respective tanks 106 and 107. The electrolyte solutions are circulated in the cell 10 by these pumps 112 and 113.

Cell Stack

Figure 2:
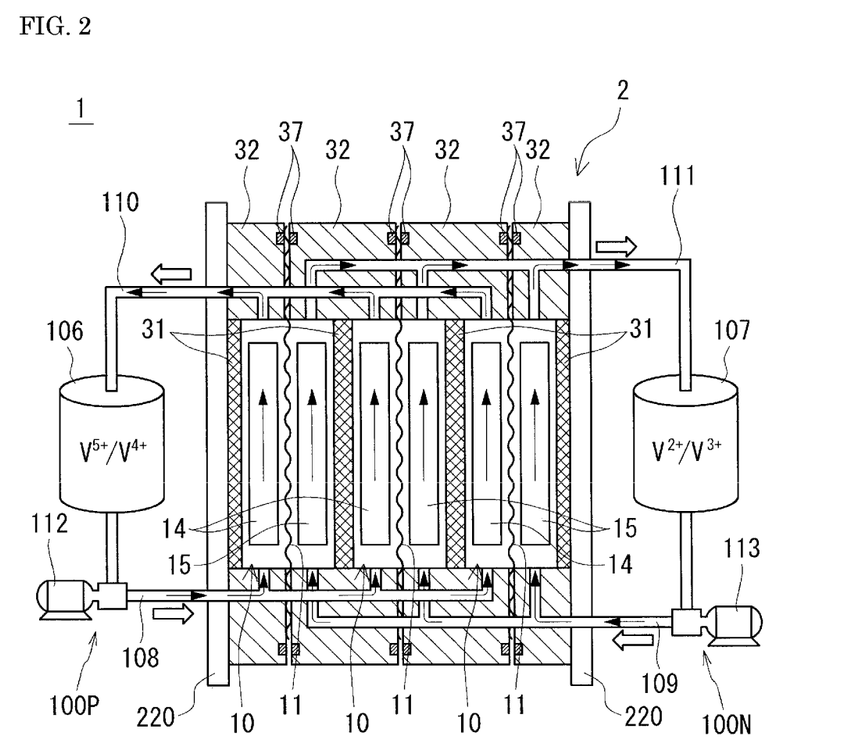
FIG. 2 is a schematic configuration diagram showing an example of the redox flow battery according to the embodiment.
Figure 3A:
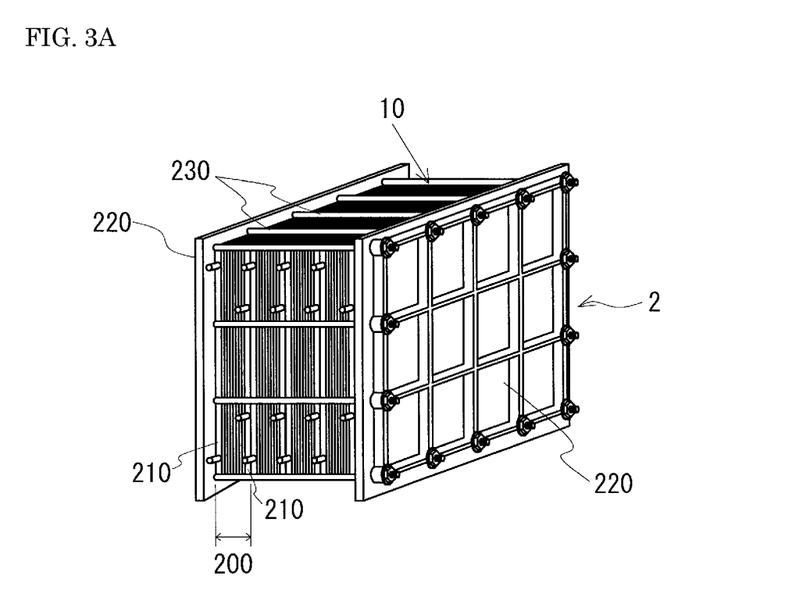
FIG. 3A is a schematic configuration diagram showing an example of a cell stack.

The cell 10 may be configured as a single cell, i.e. may include a single cell 10, or may be configured as a multi-cell, i.e. may include a plurality of cells 10. The cell 10 is commonly used in a form called a cell stack 2 that includes a plurality of stacked cells 10, as shown in FIG. 2. As shown in FIG. 3A, the cell stack 2 is configured by sandwiching sub stacks 200 from both sides by two end plates 220, and tightening the end plates 220 on the two opposite sides with tightening mechanisms 230. FIG. 3A shows an example of a cell stack 2 that includes a plurality of sub stacks 200. Each sub stack 200 has a structure in which a plurality of cell frames 3, positive electrodes 14, membranes 11, and negative electrodes 15 are stacked in that order (see FIG. 3B), and supply/discharge plates 210 (see FIG. 3A; not shown in FIG. 2) are arranged at the two opposite ends of the stacked body. The supply pipes 108 and 109 and the return pipes 110 and 111 of the circulation paths 100P and 100N (see FIGS. 1 and 2) are connected to the supply/discharge plates 210.

Cell Frame

Figure 3B:
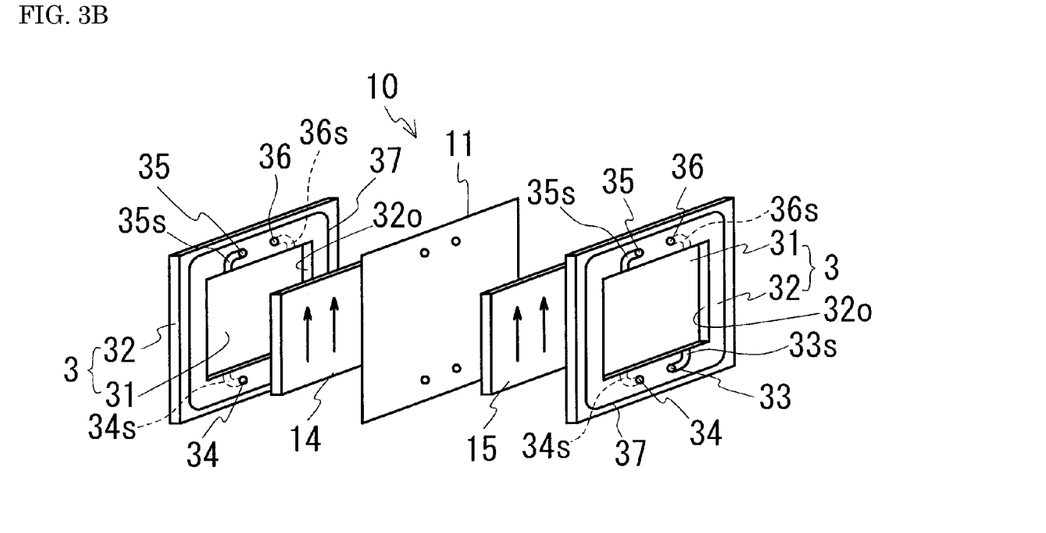
FIG. 3B is a schematic configuration diagram of a cell provided in the cell stack.
Figure 4:
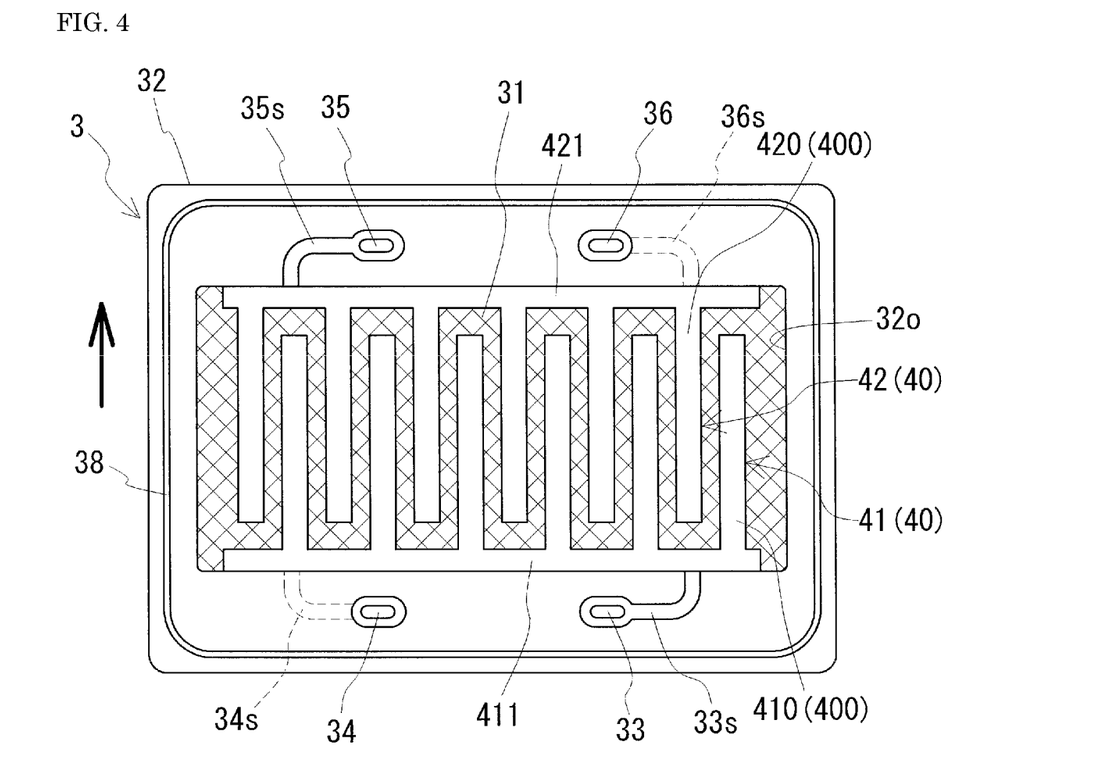
FIG. 4 is a schematic plan view of a cell frame as viewed from one face side.

As shown in FIG. 3B, each cell frame 3 has a bipolar plate 31 that is arranged between a positive electrode 14 and a negative electrode 15, and a frame member 32 that is located around the bipolar plate 31 (also see FIG. 4). The positive electrode 14 is arranged on one face side of the bipolar plate 31 so as to come into contact therewith. The negative electrode 15 is arranged on the other face side of the bipolar plate 31 so as to come into contact therewith. The bipolar plate 31 is located within the frame member 32, and recessed portions 32o are formed by the bipolar plate 31 and the frame member 32. The recessed portions 32o are formed on the two sides of the bipolar plate 31, and the positive electrode 14 and the negative electrode 15 are accommodated in the respective recessed portions 32o with the bipolar plate 31 therebetween. The recessed portions 32o form cell spaces for the positive electrode cell 12 and the negative electrode cell 13 (see FIG. 1).

The bipolar plate 31 is formed with plastic carbon or the like, for example. The frame member 32 is formed with plastic such as polyvinyl resin (PVC), polypropylene, polyethylene, fluororesin, or epoxy resin, for example. In the cell frame 3, the frame member 32 is integrated with the bipolar plate 31 therearound, by means of injection molding or the like.

In the cell stack 2 (each sub stack 200), one face side and the other face side of the frame members 32 of adjacent cell frames 3 oppose each other, and one cell 10 is formed between the bipolar plates 31 of the adjacent cell frames 3 (see FIGS. 3A and 3B). When the cell 10 is formed, the electrodes 14 and 15 are accommodated in a state of being compressed in the thickness direction in the recessed portions 32o of the respective frame members 32. The thickness of the electrodes 14 and 15 in the compressed state is determined by the depth of these recessed portions 32o. Ring-shaped seal members 37 (see FIGS. 2 and 3B), such as O rings or flat packings, are arranged between the frame members 32 of the cell frames 3 in order to suppress leakage of the electrolyte solutions. A seal groove 38 (see FIG. 4) for arranging the seal member 37 is formed on the frame members 32.

The electrolyte solutions are distributed in the cell 10 by supply manifolds 33 and 34 and discharge manifolds 35 and 36 that are formed through the frame member 32 of each cell frame 3, and supply slits 33s and 34s and discharge slits 35s and 36s that are formed in the frame member 32. In the case of the cell frame 3 (frame member 32) described in this example, the positive electrolyte solution is supplied from the supply manifold 33 formed at a lower portion of the frame member 32 to the positive electrode 14 via the supply slit 33s formed on one face side of the frame member 32. The positive electrolyte solution supplied to the positive electrode 14 is discharged to the discharge manifold 35 via the discharge slit 35s formed at an upper portion of the frame member 32. Similarly, the negative electrolyte solution is supplied from the supply manifold 34 formed at a lower portion of the frame member 32 to the negative electrode 15 via the supply slit 34s formed on the other face side of the frame member 32. The negative electrolyte solution supplied to the negative electrode 15 is discharged to the discharge manifold 36 via the discharge slit 36s formed at an upper portion of the frame member 32. The supply manifolds 33 and 34 and the discharge manifolds 35 and 36 constitute paths of the electrolyte solutions when the cell frames 3 are stacked. These paths are in communication with the supply pipes 108 and 109 and the return pipes 110 and 111 of the circulation paths 100P and 100N (see FIGS. 1 and 2) via the supply/discharge plates 210 (see FIG. 3A), allowing the electrolyte solutions to flow through the cell 10.

In the cell 10 described in this example, the electrolyte solutions are supplied from below the positive electrode 14 and the negative electrode 15, and the electrolyte solutions are discharged from above the electrodes 14 and 15. In this example, the electrolyte solutions flow through the cell 10 from lower edge portions toward upper edge portions of the electrodes 14 and 15.

Bipolar Plate

As shown in FIG. 4, each bipolar plate 31 is a grooved bipolar plate in which paths 40 with a plurality of groove portions 400 through which the electrolyte solutions flow formed on a face on the electrode side. In FIG. 4, portions in which the paths 40 (groove portions 400) are not formed are hatched to facilitate understanding. One face side (proximal side of the paper) of the bipolar plate 31 shown in FIG. 4 is a face that opposes the positive electrode 14 (see FIG.

3B; not shown in FIG. 4). The other face side (distal side of the paper) of the bipolar plate 31 is a face that opposes the negative electrode 15 (see FIG. 3B; not shown in FIG. 4). A lower edge portion of the bipolar plate 31 shown in FIG. 4 that is connected to the supply slit 33s corresponds to the positive electrolyte solution supply side. An upper edge portion of the bipolar plate 31 that is connected to the discharge slit 35s corresponds to the positive electrolyte solution discharge side. In FIG. 4, a bold arrow on the left side of the paper indicates the direction in which the electrolyte solution flows as a whole.

The groove portions 400 are formed along the direction in which the electrolyte solution flow, and are arranged at even intervals. The groove portions 400 described in this example include introduction-side groove portions 410 and discharge-side groove portions 420, and the introduction-side groove portions 410 and the discharge-side groove portions 420 are alternately arranged. One end of each introduction-side groove portion 410 is in communication with the lower edge portion of the bipolar plate 31, and the other end is formed leaving a fixed length to the upper edge portion. One end of each discharge-side groove portion 420 is in communication with the upper edge portion of the bipolar plate 31, and the other end is formed leaving a fixed length to the lower edge portion. Also, an introduction path 41 that has the introduction-side groove portions 410 and a discharge path 42 that has the discharge-side groove portions 420 are provided as the paths 40. In this example, the introduction path 41 has an introduction-side rectifying groove portion 411, which is formed along the lower edge portion of the bipolar plate 31. One end of each introduction-side groove portion 410 is in communication with the introduction-side rectifying groove portion 411. The discharge path 42 has a discharge-side rectifying groove portion 421, which is formed along the upper edge portion of the bipolar plate 31. One end of each discharge-side groove portion 420 is in communication with the discharge-side rectifying groove portion 421. The introduction-side rectifying groove portion 411 distributes the electrolyte solution supplied from the supply slit 33s to the introduction-side groove portions 410. The discharge-side rectifying groove portion 421 gathers the electrolyte solution discharged from the discharge-side groove portions 420 into the discharge slit 35s. Although, in this example, the introduction-side rectifying groove portion 411 and the discharge-side rectifying groove portion 421 are formed in the bipolar plate 31, the introduction-side rectifying groove portion 411 and the discharge-side rectifying groove portion 421 may alternatively be formed in the frame member 32.

Due to having the groove portions 400 on the face on the electrode side, the bipolar plate 31 can reduce the flow resistance of the electrolyte solutions flowing through the cell 10 (see FIGS. 2 and 3B) and reduce the pressure loss of the electrolyte solution in the cell 10. Accordingly, the internal resistance (cell resistance) in the cell 10 can be reduced. In the bipolar plate 31 shown in FIG. 4, the introduction path 41 is a path for supplying the positive electrolyte solution to the positive electrode 14 (see FIG. 3B). The discharge path 42 is a path for discharging the positive electrolyte solution. By having the introduction path 41 and the discharge path 42, the supplied positive electrolyte solution can be readily spread over the entire face of the positive electrode 14 evenly. The positive electrolyte solution supplied from the supply slit 33s to the one face side of the bipolar plate 31 flows through the introduction-side groove portions 410 via the introduction-side rectifying groove portion 411 of the introduction path 41, and spreads over the entire face of the positive electrode 14. The positive electrode solution flowing through the introduction-side groove portions 410 permeates the positive electrode 14 arranged on one face side of the bipolar plate 31, passes through portions between the introduction-side groove portions 410 and the discharge-side groove portions 420, and flows into the discharge-side groove portions 420 adjacent to the introduction-side groove portions 410. The positive electrolyte solution flowing through the discharge-side groove portions 420 of the discharge path 42 is discharged from the discharge slit 35s via the discharge-side rectifying groove portion 421.

Although FIG. 4 only shows one face side of the bipolar plate 31 (the face on the positive electrode 14 side), paths that have a plurality of groove portions through which the negative electrolyte solution flows are also formed on the other face side (the face on the negative electrode 15 side) of the bipolar plate 31, similarly to the one face side. The configuration of the groove portions (paths) for the negative electrolyte solution formed on the other face side of the bipolar plate 31 is the same as the groove portions 400 (paths 40) for the positive electrolyte solution shown in FIG. 4, and the description thereof is omitted accordingly.

In this example, the groove portions 400 (the introduction-side groove portions 410 and the discharge-side groove portions 420) have the same width and depth, and the cross-sectional shapes thereof are substantially equal and uniform in the lengthwise direction. The width (opening width) and the depth of the groove portions 400 and the space between adjacent groove portions 400 may be selected as appropriate in accordance with the size and the thickness of the bipolar plate 31, and are not specifically limited. The cross-sectional shape of each groove portion 400 (the shape of a cross section orthogonal to the lengthwise direction (the direction in which the electrolyte solution flows) of the groove portions 400)) may be a rectangular shape, a triangular shape (V-shape), a trapezoidal shape, a semi-circular shape, a semi-elliptical shape, or the like, for example. In this example, a substantially rectangular shape (see FIG. 5).

The width of each groove portion 400 (the opening width denoted as w in FIG. 5) may be not less than 0.5 mm and not more than 10 mm, and furthermore, not less than 1 mm and not more than 5 mm, for example. The depth of each groove portion 400 (the depth denoted as d from the opening to the bottom in FIG. 5) may be not less than 0.5 mm and not more than 5 mm, and furthermore, not less than 1 mm and not more than 3 mm, for example. The interval between adjacent groove portions 400 may be not less than 0.5 mm and not more than 30 mm, and furthermore, not less than 1 mm and not more than 5 mm, for example.

Electrodes

Figure 5:
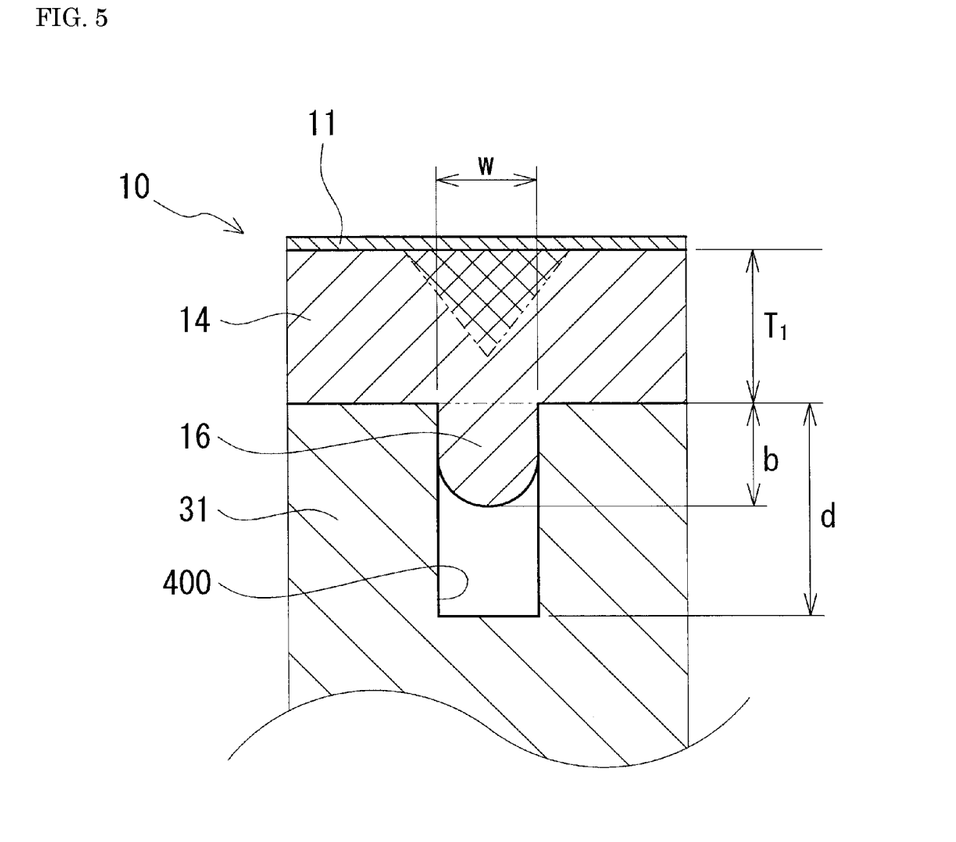
FIG. 5 is a schematic cross-sectional view illustrating a redox flow battery cell according to the embodiment.

A buried portion of each electrode, which is one of the characteristics of the cell 10 according to the embodiment, will be described, mainly with reference to FIG. 5. FIG. 5 shows a cross section in the thickness direction orthogonal to the surface of the bipolar plate 31, i.e. a cross section orthogonal to the lengthwise direction (the direction in which the electrolyte solution flows) of the groove portions 400. FIG. 5 only shows a portion on the positive electrode 14 side that constitutes the cell 10, and the negative electrode 15 side, which is the same as the positive electrode 14 side, is omitted in the diagram. In the case where the groove portions 400 are provided on the face of the bipolar plate 31 on the electrode side, when the cell 10 is formed, the electrode 14 is pressed toward the bipolar plate 31 side and is compressed and deformed in the cell 10. Thus, a portion of the electrode 14 enters a state of being buried into a groove portion 400, as shown in FIG. 5. One of the characteristics of the cell 10 according to the embodiment lies in that the electrode 14 has buried portions 16 that are buried into the groove portions 400 of the bipolar plate 31, and the amount of burial of each buried portion 16 (the largest length denoted as b from the opening of the groove portion 400 to the leading end of the buried portion 16 in FIG. 5) is not less than 0.2 mm and not more than 1.4 mm. Note that FIG. 5 schematically shows the state of the buried portion 16 in an exaggerating manner for convenience of description.

Amount of Burial of Buried Portion

The reaction resistance of the electrode 14 can be reduced by controlling the amount of burial of each buried portion 16 within the aforementioned range. The reason for this is assumed to be as follows. If the amount of burial of each buried portion 16 is too small, the fiber density at the portion located above the groove portion 400 (a portion above the buried portion 16 that is not buried into the groove portion 400) becomes too large, and a turbulent flow is more likely to occur in the flow of the electrolyte solution that passes through this non-buried portion (the cross-hatched portion in FIG. 5). For this reason, there is a concern that the flow-smoothing effect of suppressing a turbulent flow of the electrolyte solution passing through the electrode 14 will be lost, and the reaction resistance that depends on the flow rate of the electrolyte solution (flow rate-dependent resistance) will increase. On the other hand, if the amount of burial of the buried portion 16 is too large, the fiber density at the portion located above the groove portion 400 (the non-buried portion) becomes too small, making it difficult for charge transfer at the interface between the electrode 14 and the membrane 11 to occur smoothly. Thus, there is a concern that the reaction resistance due to the charge transfer (charge transfer resistance) will increase. Here, although a turbulent flow may also occur at a portion of the electrode 14 that is not located above the groove portion 400 and is in contact with the surface of the bipolar plate 31, a turbulent flow occurring at the position located above the groove portion 400 more significantly affects the reaction resistance of the electrode 14.

If the amount of burial of the buried portion 16 is not less than 0.2 mm and not more than 1.4 mm, the fiber density at the portion (non-buried portion) located above the groove portion 400 can be appropriately maintained. Thus, the flow-smoothing effect is achieved in the electrode 14, and charge transfer at the interface between the electrode 14 and the membrane 11 smoothly occurs. Accordingly, an increase in the flow rate-dependent resistance and the charge transfer resistance can be suppressed, so that the reaction resistance of the electrode 14 can be reduced. In addition, if the amount of burial of the buried portion 16 is not less than 0.2 mm and not more than 1.4 mm, variations in the temperature change in the electrolyte solution flowing through the cell 10 can be readily reduced. This makes it possible to readily maintain the stability of the electrolyte solution and further suppress degradation of the battery performance. The amount of burial of the buried portion 16 may further be not less than 0.3 mm and not more than 0.7 mm, and not less than 0.4 mm and not more than 0.6 mm. The amount of burial of the buried portion 16 can be controlled by the electrode material, the characteristics of the electrode 14 (thickness, compression ratio, porosity etc.), the type and characteristics (fiber diameter, Young's modulus etc.) of the carbon fibers that constitute the electrode 14, or the like.

Burial Ratio

Furthermore, it is preferable that the ratio (burial ratio) of the cross-sectional area of the buried portion 16 to the cross-sectional area of the groove portion 400 is not less than 0.4% and not more than 75%. This configuration can effectively reduce the reaction resistance of the electrode, and readily reduce variations in the temperature change in the electrolyte solution flowing through the cell 10. The burial ratio may further be not less than 5% and not more than 40%, and not less than 10% and not more than 30%. Here, the cross-sectional areas of the groove portion 400 and the buried portion 16 refer to the cross-sectional areas of a cross section in the thickness direction orthogonal to the surface of the bipolar plate 31, and are the cross-sectional areas of a cross section orthogonal to the lengthwise direction (the direction in which the electrolyte solution flows) of the groove portion 400 (the cross section shown in FIG. 5).

Electrode Material

The electrode 14 is made of a carbon fiber aggregate. The electrode 14 of the carbon fiber aggregate is porous, and has pores in the electrode 14. For this reason, the electrolyte solution flows through the electrode 14, and the electrolyte solution can be permeated and diffused. Accordingly, the reaction area between the electrode 14 and the electrolyte solution increases, and the reaction field can be readily secured. Typically, the carbon fiber aggregate may be carbon felt or carbon cloth. Carbon felt or carbon cloth has moderate flexibility and can be readily deformed. Accordingly, the buried portion 16 can be readily formed if carbon felt or carbon cloth is used as the electrode material. In particular, the carbon fibers in carbon felt are randomly oriented, and there is an advantage such as ease of diffusion of the electrolyte solution to every corner of the electrode 14. Typically, the carbon fibers may be PAN-based carbon fibers, pitch-based carbon fibers, or rayon-based carbon fibers.

Thickness of Electrode

The thickness of the electrode 14 may be not less than 0.3 mm and not more than 1.5 mm, for example. This configuration can readily control the amount of burial of the buried portion 16 within the aforementioned range. If the thickness of the electrode 14 is not less than 0.3 mm, the reaction area (reaction field) between the electrode 14 and the electrolyte solution can be readily secured sufficiently. If the thickness of the electrode 14 is not more than 1.5 mm, the electrolyte solution can be readily permeated and diffused sufficiently over the entire electrode 14. If the thickness of the electrode 14 is not more than 1.5 mm, the thickness of the cell 10 can be reduced. The thickness of the electrode 14 may further be not less than 0.5 mm and not more than 1.3 mm.

The aforementioned thickness of the electrode 14 is the thickness in an uncompressed state (natural state), rather than the thickness in the compressed state in the cell 10. The thickness of the electrode 14 in the compressed state (the thickness denoted as $T_1$ in FIG. 5) can be obtained by observing a cross section of the cell 10 taken along the thickness direction using an optical microscope, a scanning electron microscope (SEM), or the like, and measuring the thickness of a portion of the electrode 14 that is in contact with the surface of the bipolar plate 31, the portion excluding the buried portion 16 (i.e. a portion that is not located above the groove portion 400). The thickness of the electrode 14 in the uncompressed state can be obtained by measuring the thickness in the natural state where no external force acts on the electrode 14, i.e. by measuring the thickness of the electrode 14 before assembling the cell 10, or by measuring the thickness of the electrode 14 after being taken out of the assembled cell 10.

Compression Ratio of Electrode

The compression ratio of the electrode 14 may be not less than 60% and not more than 95%, for example. Due to the compression ratio of the electrode 14 being not less than 60%, the electrode 14 is deformed and a portion thereof is buried into each groove portion 400, allowing the buried portion 16 to be readily formed. If the compression ratio of the electrode 14 is not less than 60%, the reaction area per unit volume of the electrode 14 increases, and the efficiency of reaction with the electrolyte solution increases. Due to the compression ratio of the electrode 14 being 95% or less, pores in the electrode 14 can be readily secured to sufficiently secure the flowability of the electrolyte solution. Accordingly, the cell resistance due to the flow resistance of the electrolyte solution can be reduced. If the compression ratio of the electrode 14 is not more than 95%, damage to the electrode 14 due to excessive deformation can be suppressed. The compression ratio of the electrode 14 may further be not less than 70% and not more than 90%. For example, the compression ratio of the electrode 14 can be adjusted by the thickness of the electrode 14 and the depth of the cell space (the recessed portion 32o of the cell frame 3 shown in FIG. 3B) for accommodating the electrode 14.

When the thickness of the electrode 14 in the compressed state is $T_1$ and the thickness thereof in the uncompressed state is $T_0$, the compression ratio of the electrode 14 is expressed as $\{(T_0-T_1)/T_0\}\times100(\%)$.

Porosity of Electrode

The porosity of the electrode 14 may be not less than 70%, for example. Due to the porosity of the electrode 14 being not less than 70%, the electrode 14 can be readily deformed, and the buried portion 16 can be readily formed. Also, if the porosity of the electrode 14 is not less than 70%, the flowability of the electrolyte solution can be readily secured sufficiently, and the electrolyte solution can be readily permeated and diffused sufficiently in the electrode 14. The upper limit of the porosity of the electrode 14 may be not more than 95%, for example. This configuration can suppress a decrease in the reaction area and a decrease in the strength of the electrode 14 due to a decrease in the fiber density. The compression ratio of the electrode 14 may further be not less than 80% and not more than 90%. In the case of using carbon felt or carbon cloth, the porosity of the electrode 14 can be adjusted by the weight per unit (fiber density) of the carbon fibers.

The aforementioned porosity of the electrode 14 is the porosity in the uncompressed state (natural state), rather than the porosity in the compressed state in the cell 10. When the true volume of the electrode 14 is V, and the apparent volume is Va, the porosity of the electrode 14 is expressed as $\{(Va-V)/Va\}\times100(\%)$. The true volume V of the electrode 14 can be calculated by dividing the mass of the electrode 14 by the density at the carbon fibers that constitute the electrode 14.

Fiber Diameter of Carbon Fiber

The average fiber diameter of each carbon fiber may be not more than 20 μm, for example. Due to the average fiber diameter of the carbon fiber being not more than 20 μm, the fibers are thin and flexible. Accordingly, the electrode 14 can be readily deformed, and the buried portion 16 can be readily formed. Furthermore, due to the fibers being flexible, the fibers are unlikely to stick into the membrane 11. If the average fiber diameter of each carbon fiber is not more than 20 μm, the reaction area per unit volume of the electrode 14 increases, and the efficiency of reaction with the electrolyte solution increases. The lower limit of the average fiber diameter of each carbon fiber may be not less than 5 μm, and further, not less than 10 μm, for example. This configuration can suppress a decrease in the strength of the electrode 14.

The fiber diameter of each carbon fiber is obtained based on the diameter (equal-area circle diameter) of a circle having an area equal to the cross-sectional area of the fibers (the projected area of a cross section orthogonal to the longitudinal direction of the fiber). The average fiber diameter of each carbon fiber is obtained by observing a cross section of the electrode 14 using an optical microscope, a scanning electron microscope (SEM), or the like and measuring the fiber diameters (equal-area circle diameters) of the carbon fibers by means of image analysis, and an average value of the measured fiber diameters is used as the average fiber diameter. The number of fibers to be used to measure the fiber diameter is not less than 10 and not less than 20, for example.

Young's Modulus of Carbon Fiber

The Young's modulus of the carbon fibers may be not less than 20 GPa and not more than 200 GPa, for example. Due to the Young's modulus of the carbon fibers being not less than 20 GPa, the fibers have high bending rigidity. Thus, when the electrode 14 is compressed and deformed, damage to the electrode 14 can be suppressed. Due to the Young's modulus of the carbon fibers being not more than 200 GPa, the electrode 14 can be readily deformed, and the buried portion 16 can be readily formed. Also, if the Young's modulus of the carbon fibers is not more than 200 GPa, the fibers can be refrained from sticking into the membrane 11. The Young's modulus of the carbon fibers can be adjusted by the type of carbon fiber, calcination conditions (calcination temperature etc.) for carbonizing organic fibers serving as the material, or the like, for example.

The Young's modulus of the carbon fibers may be obtained by extracting the carbon fibers from the electrode 14 and measuring the Young's modulus by means of a tension test.

Effects of Embodiment

Due to the cell 10 according to the embodiment having the groove portions 400 on the face of the bipolar plate 31 on the electrode side, it is possible to reduce the flow resistance of the electrolyte solution flowing through the cell 10 and reduce the pressure loss of the electrolyte solution in the cell 10. In addition, due to the electrode 14 being formed with a carbon fiber aggregate, the electrolyte solution flows through the electrode 14 and can be permeated and diffused, and the reaction area (reaction field) between the electrode 14 and the electrolyte solution can be readily secured. Furthermore, due to the amount of burial of each of the buried portions 16 of the electrode 14 that are buried into the groove portions 400 of the bipolar plate 31 being not less than 0.2 mm and not more than 1.4 mm, it is possible to suppress an increase in the flow rate-dependent resistance and the charge transfer resistance and reduce the reaction resistance of the electrode 14. Accordingly, the cell 10 can reduce the reaction resistance of the electrode 14 while being able to reduce the pressure loss of the electrolyte solution.

If the amount of burial of each buried portion 16 being not less than 0.2 mm and not more than 1.4 mm, variations in the temperature change in the electrolyte solution flowing through the cell 10 can be readily reduced. This configuration can readily maintain the stability of the electrolyte solution and further suppress degradation of the battery performance.

The RF battery 1 according to the embodiment, which includes the cell 10 according to the embodiment, can reduce the reaction resistance of the electrode 14 while being able to reduce the pressure loss of the electrolyte solution in the cell 10. Accordingly, the RF battery 1 has excellent battery performance.

Test Example 1

The cell described in the above embodiment was produced, and an RF battery was assembled using this cell and evaluated.

In the test example 1, a plurality of single cells (samples No. 1 to 5 and 11 to 18) with different amounts of burial of the buried portions were produced using various types of carbon felt with different specifications of the thickness, porosity, and so on, to make the electrodes. In the single cells of the sample, the same carbon felt electrodes were used in the positive and negative electrodes, and the area of each electrodes was 9 cm². The carbon fibers that constitute the electrodes used in the single cells of the samples was rayon-based carbon fibers, and the fiber diameters and the Young's modulus of the carbon fibers in the samples were different. Cell frames with different depths of the recessed portions for accommodating the electrodes were prepared as the cell frames used in the single cells of the samples, thereby adjusting the compression ratios of the electrodes of the samples.

Grooved bipolar plates in which paths with groove portions formed on the faces on the positive and negative electrode sides were used as the bipolar plates. The configuration of the groove portions (paths) of the bipolar plates used in the single cells of the samples was the same. The width (opening width) of each groove portion was 1 mm, the depth of each groove portion was 2 mm, the cross-sectional area of each groove portion was 2 mm², and the cross-sectional shape of each groove portion was a rectangular shape.

Charge-Discharge Test

Single-cell RF batteries were assembled using the single cells of the samples, and charge-discharge test was conducted at room temperature (25° C.) for each battery. A vanadium sulfate solution (vanadium concentration: 1.7 mol/L) was used as the positive and negative electrolyte solutions. The charge-discharge test was conducted at a constant current with a current density of 90 mA/cm², and upon reaching a predetermined switching voltage that is set in advance, charging and discharging were switched to perform a plurality of cycles of charging and discharging. Then, an average voltage and average current in any one of the plurality of cycles were obtained, and cell resistance was obtained. The cell resistance is calculated by multiplying a resistance value, which is obtained by dividing the average voltage by the average current, by the electrode area.

Reaction Resistance of Electrode

The reaction resistance of each electrode was obtained based on the cell resistance obtained using the single cell in each sample. The reaction resistance is resistance obtained by subtracting the conductive resistance from the cell resistance, and is calculated with the following formula. The conductive resistance was obtained by performing measurement with Battery Hi-Tester. The reaction resistances in the samples are shown in Table 1.

Reaction resistance ($\Omega \cdot cm^2$)=cell resistance ($\Omega \cdot cm^2$)–conductive resistance ($\Omega \cdot cm^2$)

Temperature Difference in Electrolyte Solution

Also, thermometers were attached to the input side and output side of the cell of each battery, and in the charge-discharge test, the temperature of the electrolyte solution supplied to the cell and the temperature of the electrolyte solution discharged from the cell were measured. Then, a difference (hereinafter referred to as a "solution temperature difference") between the lowest temperature of the electrolyte solution supplied to the cell and the highest temperature of the electrolyte solution discharged from the cell in the first cycle was obtained. The solution temperature differences in the samples are shown in Table 1.

Amount of Burial of Buried Portion

After the charge-discharge test, a cross section of the single cell in each sample taken along the thickness direction was observed with an optical microscope, and the amount of burial and the burial ratio of the buried portions in each sample were measured. Here, the amounts of burial and the burial ratio of the buried portions at 10 locations were measured for each one of the samples, and the average values thereof were obtained. The amount of burial and the burial ratio of the buried portion in the samples are shown in Table 1. Also, the thickness of the electrode in the compressed state was measured using a cross section of the single cell taken along the thickness direction.

Thickness, Compression Ratio, and Porosity of Electrode

After the charge-discharge test, the electrodes were taken out of the single cell in each sample, washed, and then dried. Thereafter, the thickness of the electrode in each sample in the uncompressed state (natural state) was measured. The compression ratio of the electrode was obtained by calculation based on the thickness of the electrode in the compressed state and the thickness in the uncompressed state. Also, the true volume and the apparent volume of the electrode were measured, and the porosity of the electrode was obtained by calculation. The thickness, the compression ratio, and the porosity of the electrode in each sample are shown in Table 1.

Average Fiber Diameter and Young's Modulus of Carbon Fibers

After the charge-discharge test, a cross section of the electrode taken out of the single cell in each sample was observed with an SEM, the fiber diameters (equal-area circle diameters) of 10 carbon fibers were measured by means of image analysis, and the average fiber diameter of the carbon fibers was obtained by calculating the average value of the measured fiber diameters. Also, the carbon fibers were extracted from the electrode and a tensile test was conducted to measure the Young's modulus of the carbon fibers. The average fiber diameter and Young's modulus of the carbon fibers that constitute the electrode in each sample are shown in Table 1.

TABLE 1

| | Buried portion | | Electrode | | | Carbon fiber | | | Solution |
|---|---|---|---|---|---|---|---|---|---|
| Sample No. | Amount of burial (mm) | Burial ratio (%) | Thickness (mm) | Compression ratio (%) | Porosity (%) | Average Fiber Diameter (μm) | Young's Modulus (GPa) | Reaction Resistance ($\Omega \cdot m^2$) | temperature difference (° C.) |
| 1 | 0.6 | 16 | 0.9 | 70 | 83 | 10 | 30 | 0.16 | 4 |
| 2 | 0.3 | 5 | 0.6 | 70 | 81 | 20 | 150 | 0.18 | 3 |
| 3 | 0.4 | 19 | 0.6 | 90 | 80 | 20 | 150 | 0.17 | 3 |
| 4 | 0.5 | 25 | 0.9 | 85 | 83 | 10 | 30 | 0.16 | 3 |
| 5 | 1.2 | 40 | 1.5 | 95 | 85 | 10 | 30 | 0.20 | 4 |
| 11 | 1.6 | 80 | 1.8 | 70 | 76 | 10 | 30 | 0.37 | 7 |
| 12 | 0.1 | 0.1 | 0.2 | 70 | 81 | 20 | 150 | 0.26 | 6 |
| 13 | 0.1 | 0.1 | 0.6 | 45 | 73 | 20 | 150 | 0.29 | 6 |
| 14 | 1.5 | 90 | 1.5 | 99 | 75 | 10 | 30 | 0.31 | 9 |
| 15 | 0.1 | 4 | 0.4 | 50 | 64 | 20 | 150 | 0.26 | 6 |
| 16 | 0.1 | 4 | 0.4 | 50 | 72 | 30 | 200 | 0.27 | 7 |
| 17 | 1.5 | 70 | 1.5 | 95 | 78 | 10 | 15 | 0.31 | 8 |
| 18 | 0.1 | 2 | 0.6 | 50 | 80 | 20 | 300 | 0.29 | 6 |

As shown in Table 1, in the samples No. 1 to 5, the amounts of burial of the buried portion are not less than 0.2 mm and not more than 1.4 mm, and the burial ratios satisfy a range from 0.4% to 75%. Based on the results shown in Table 1, it can be understood that, in the samples No. 1 to 5 in which amount of burial of the buried portion is in the range from 0.2 mm to 1.4 mm, the reaction resistances are smaller than those of the samples No. 11 to 18 in which the amount of burial is out of that range, and the reaction resistances are suppressed. Specifically, the reaction resistance in the samples No. 1 to 5 is not more than 0.25 $\Omega \cdot cm^2$, and further, not more than 0.20 $\Omega \cdot cm^2$. Accordingly, if the amount of burial of each of the buried portions of the electrode that are buried into the groove portions of the bipolar plate is not less than 0.2 mm and not more than 1.4 mm, it is possible to reduce the reaction resistance of the electrode and improve the battery performance of the RF battery. Furthermore, in the samples No. 1 to 5, the solution temperature differences are not more than 5° C., which is smaller than the solution temperature differences in the samples No. 11 to 18. Based on the above, it can be understood that, in the samples No. 1 to 5, variations in the temperature change in the electrolyte solution flowing through the cell is small.

In addition, based on the results shown in Table 1, it can be understood that the amount of burial and the burial ratio of the buried portion can be readily controlled within the aforementioned range by setting the characteristics (thickness, compression ratio, porosity) of the electrode and the characteristics (fiber diameter, Young's modulus) of the carbon fibers that constitute the electrode within a predetermined range.

LIST OF REFERENCE NUMERALS

1 Redox flow battery (RF battery)
2 Redox flow battery cell (cell stack)
10 Redox flow battery cell (cell)
11 Membrane
12 Positive electrode cell
13 Negative electrode cell
14 Positive electrode
15 Negative electrode
16 Buried portion
3 Cell Frame
31 Bipolar plate
32 Frame member
32o Recessed portion
33, 34 Supply manifold
35, 36 Discharge manifold
33s, 34s Supply slit
35s, 36s Discharge slit
37 Seal member
38 Seal groove
40 Flow path
41 Introduction path
42 Discharge path
400 Groove portion
410 Introduction-side groove portion
411 Introduction-side rectifying groove portion
420 Discharge-side groove portion
421 Discharge-side rectifying groove portion
100P Positive electrode circulation path
100N Negative electrode circulation path
106 Positive electrolyte solution tank
107 Negative electrolyte solution tank
108, 109 Supply pipe
110, 111 Return pipe
112, 113 Pump
200 Sub stack
210 Supply/discharge plate
220 End plate
230 Tightening mechanism
80 AC-DC converter
90 Power grid

The invention claimed is:

1. A redox flow battery cell comprising:
   an electrode to which an electrolyte solution is supplied; and
   a bipolar plate with which the electrode is arranged,
   wherein the bipolar plate has at least one groove portion through which the electrolyte solution flows, on a face on the electrode side,
   the electrode is made of a carbon fiber aggregate containing carbon fibers, and has a buried portion that is pressed toward the bipolar plate side and buried into the groove portion, and
   an amount of burial of the buried portion is not less than 0.2 mm and not more than 1.4 mm.

2. The redox flow battery cell according to claim 1, wherein a ratio of a cross-sectional area of the buried portion to a cross-sectional area of the groove portion is not less than 0.4% and not more than 75%.

3. The redox flow battery cell according to claim 2, wherein a thickness of the electrode is not less than 0.3 mm and not more than 1.5 mm.

4. The redox flow battery cell according to claim 2, wherein a compression ratio of the electrode is not less than 60% and not more than 95%.

5. The redox flow battery cell according to claim 1, wherein a thickness of the electrode is not less than 0.3 mm and not more than 1.5 mm.

6. The redox flow battery cell according to claim 5, wherein a Young's modulus of the carbon fibers is not less than 20 GPa and not more than 200 GPa.

7. The redox flow battery cell according to claim 1, wherein a compression ratio of the electrode is not less than 60% and not more than 95%.

8. The redox flow battery cell according to claim 7, wherein an average fiber diameter of each of the carbon fibers is not more than 20 μm.

9. The redox flow battery cell according to claim 1, wherein a porosity of the electrode is not less than 70%.

10. The redox flow battery cell according to claim 1, wherein the carbon fiber aggregate is at least one element selected from a group consisting of carbon felt, carbon cloth, and carbon paper.

11. The redox flow battery cell according to claim 10, wherein a Young's modulus of the carbon fibers is not less than 20 GPa and not more than 200 GPa.

12. The redox flow battery cell according to claim 1, wherein an average fiber diameter of each of the carbon fibers is not more than 20 μm.

13. The redox flow battery cell according to claim 12, wherein the carbon fiber aggregate is carbon felt.

14. The redox flow battery cell according to claim 1, wherein a Young's modulus of the carbon fibers is not less than 20 GPa and not more than 200 GPa.

15. A redox flow battery comprising the redox flow battery cell according to claim 1.

* * * * *